US010552732B2

(12) United States Patent
Li et al.

(10) Patent No.: US 10,552,732 B2
(45) Date of Patent: Feb. 4, 2020

(54) MULTI-LAYER NEURAL NETWORK

(71) Applicant: Kneron Inc., San Diego, CA (US)

(72) Inventors: Yilei Li, San Diego, CA (US); Yuan Du, Los Angeles, CA (US); Chun-Chen Liu, San Diego, CA (US); Li Du, San Diego, CA (US)

(73) Assignee: Kneron Inc., San Diego, CA (US)

( * ) Notice: Subject to any disclaimer, the term of this patent is extended or adjusted under 35 U.S.C. 154(b) by 751 days.

(21) Appl. No.: 15/242,610

(22) Filed: Aug. 22, 2016

(65) Prior Publication Data

US 2018/0053084 A1    Feb. 22, 2018

(51) Int. Cl.
*G06N 3/063* (2006.01)

(52) U.S. Cl.
CPC .................. *G06N 3/063* (2013.01)

(58) Field of Classification Search
CPC .............. G06N 3/063; G06N 3/0454
See application file for complete search history.

(56) References Cited

U.S. PATENT DOCUMENTS

| 8,468,109 | B2 | 6/2013 | Moussa | |
|---|---|---|---|---|
| 9,209,809 | B1 * | 12/2015 | Geary | H03K 19/00384 |
| 2014/0344203 | A1 * | 11/2014 | Ahn | G06N 3/08 |
| | | | | 706/25 |
| 2015/0371132 | A1 * | 12/2015 | Gemello | H01L 29/66636 |
| | | | | 706/20 |

FOREIGN PATENT DOCUMENTS

TW    201331855 A1    8/2013

OTHER PUBLICATIONS

Rojas, R. (1996). Neural Networks: A Systematic Introduction. Springer Science & Business Media. Chapter 18 (Year: 1996).*
Sankaradas, M., Jakkula, V., Cadambi, S., et al. (2009, Jul.). A massively parallel coprocessor for convolutional neural networks. In 2009 20th IEEE International Conference on Application-specific Systems, Architectures and Processors (pp. 53-60). IEEE. (Year: 2009).*
Krizhevsky, A., Sutskever, I., & Hinton, G. E. (2012). Imagenet classification with deep convolutional neural networks. In Advances in neural information processing systems (pp. 1097-1105). (Year: 2012).*

* cited by examiner

*Primary Examiner* — Austin Hicks
(74) *Attorney, Agent, or Firm* — Winston Hsu

(57) ABSTRACT

A multi-layer artificial neural network having at least one high-speed communication interface and N computational layers is provided. N is an integer larger than 1. The N computational layers are serially connected via the at least one high-speed communication interface. Each of the N computational layers respectively includes a computation circuit and a local memory. The local memory is configured to store input data and learnable parameters for the computation circuit. The computation circuit in the ith computational layer provides its computation results, via the at least one high-speed communication interface, to the local memory in the (i+1)th computational layer as the input data for the computation circuit in the (i+1)th computational layer, wherein i is an integer index ranging from 1 to (N−1).

8 Claims, 4 Drawing Sheets

MULTI-LAYER NEURAL NETWORK

BACKGROUND OF THE INVENTION

1. Field of the Invention

The present invention relates to artificial neural networks. In particular, the present invention relates to multi-layer neural networks capable of performing deep learning.

2. Description of the Prior Art

The idea of artificial neural networks has existed for a long time. Nevertheless, limited computation ability of hardware had been an obstacle to related researches. Over the last decade, there are significant progresses in computation capabilities of processors and algorithms of machine learning. Not until recently did an artificial neural network that can generate reliable judgements become possible. Gradually, artificial neural networks are experimented in many fields such as autonomous vehicles, image recognition, natural language understanding, and data mining.

Currently, most artificial neural networks are designed as having a multi-layer structure. Layers serially connected between the input layer and the output layer are called hidden layers. Each layer includes plural neurons. The input layer receives external data and does not perform computation. In a hidden layer or the output layer, input signals are the output signals generated by its previous layer. Each of the hidden layers and output layer can respectively be either a convolutional layer or a fully-connected layer. At the present time, there are a variety of network structures. Every structure has its unique combination of convolutional layers and fully-connected layers. Taking the AlexNet structure proposed by Alex Krizhevsky et al. in 2012 as an example, the network includes 650,000 artificial neurons that form five convolutional layers and three fully-connected layers connected in serial. When a complicated judgment is required, an artificial neural network may include up to twenty-nine computational layers.

Practically, most artificial neural networks are implemented in either a supercomputer or a single-chip system. When a single-chip system is utilized, the circuits in the chip act as different layers at different time instants. FIG. 1 shows the function block diagram of a single-chip system as an example. The counter 11 is configured to generate reference clocks for the controller 12 and the processor 13. In a first work cycle, the processor 13 acts as a first computational layer. At the beginning of the first work cycle, the controller 12 requests the memory 14 to load the input data should be processed by the first computational layer and the learnable parameters of neurons in the first computational layer into the local register 13A. When performing computations corresponding to the first computational layer, the processor 13 stores its computation results in the local register 13A temporarily. After the processor 13 completes all computations corresponding to the first computational layer, the computation results temporarily stored in the local register 13A are transferred to the memory 14. Subsequently, in a second work cycle, the processor 13 acts as a second computational layer instead. Therefore, the controller 12 requests the memory 14 to load the input data should be processed by the second computational layer and the learnable parameters of neurons in the second computational layer into the local register 13A. And so on, the processor 13 can sequentially complete computations corresponding to each computational layer in a multi-layer neural network.

In a multi-layer neural network, the amounts of input data, learnable parameters, and computation results of each computational layer are all considerably large. Hence, one disadvantage of the above practice is there must be a huge amount of data transfer between the local register 13A and the memory 14. Because massive data transfer is pretty time-consuming, the overall performance of such neural network is accordingly limited. Moreover, it is seen in the above example, the processor 13 cannot perform computations corresponding to the second computational layer until the computation results corresponding to the first computational layer are fed back from the local register 13A to the memory 14 and the new data and learnable parameters are loaded from the memory 14 to the local register 13A. The processor 13 spends a lot of time waiting for data transfer and its computation resource is accordingly not fully utilized.

SUMMARY OF THE INVENTION

To solve the aforementioned problems, new artificial neural networks are provided.

One embodiment according to the invention is a multi-layer artificial neural network including at least one high-speed communication interface and N computational layers. N is an integer larger than 1. The N computational layers are serially connected via the at least one high-speed communication interface. Each of the N computational layers respectively includes a computation circuit and a local memory. The local memory is configured to store input data and learnable parameters for the computation circuit. The computation circuit in the ith computational layer provides its computation results, via the at least one high-speed communication interface, to the local memory in the (i+1)th computational layer as the input data for the computation circuit in the (i+1)th computational layer, wherein i is an integer index ranging from 1 to (N−1).

The advantage and spirit of the invention may be understood by the following recitations together with the appended drawings.

These and other objectives of the present invention will no doubt become obvious to those of ordinary skill in the art after reading the following detailed description of the preferred embodiment that is illustrated in the various figures and drawings.

The figures described herein include schematic block diagrams illustrating various interoperating functional modules. It should be noted that such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

DETAILED DESCRIPTION

Figure 1:
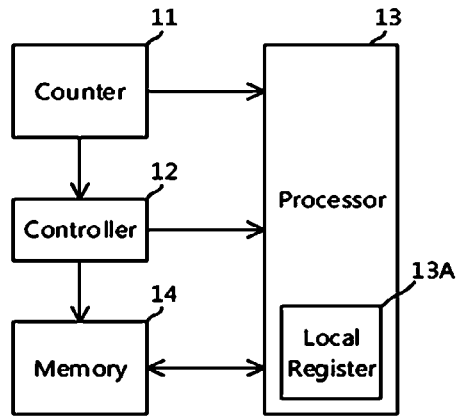
FIG. 1 shows the function block diagram of a single-chip system as an example.
Figure 2:
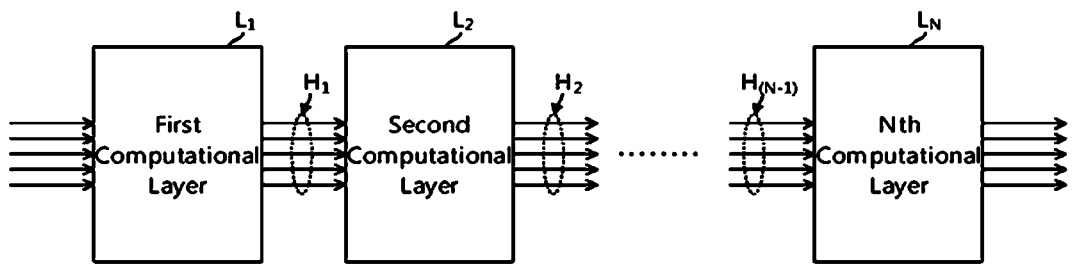
FIG. 2 illustrates the function block diagram of the multi-layer neural network in one embodiment according to the invention.

Please refer to FIG. 2. One embodiment according to the invention is a multi-layer artificial neural network including (N−1) high-speed communication interfaces $H_1$ to $H_{(N-1)}$ and N serially connected computational layers $L_1$ to $L_N$. N is an integer larger than 1. Taking an artificial neural network including three hidden layers as an example, the circuit designer can choose four as the value N and assign the computational layers $L_1$ to $L_4$ respectively to the three hidden layers and an output layer. Practically, the value of N can be determined based on the actual condition in which the neural network 200 is applied and is not limited to a specific number.

As shown in FIG. 2, two adjacent computational layers are connected via a high-speed communication interface H. For instance, the high-speed communication interface H can be but not limited to a high speed serializer-deserializer (SerDes) or a radio frequency interface (RFI). The higher the transmission speed of the interface H is, the faster the data transfer between two computational layers is. The scope of the invention is not limited to the transmission speed of the high-speed communication interface H.

Figure 3:
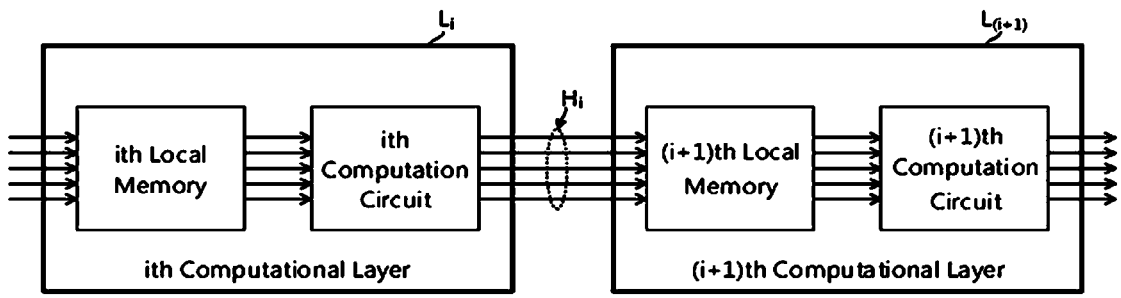
FIG. 3 illustrates the detailed connection between two adjacent computational layers according to the invention.

Each of the N computational layers in FIG. 2 has an independent hardware. More specifically, each computational layer respectively includes a computation circuit and a local memory. The ith computational layer $L_i$ and the (i+1)th computational layer $L_{(i+1)}$ are taken as an example and illustrated in FIG. 3 to show the detailed connection between two adjacent computational layers, wherein i is an integer index ranging from 1 to (N−1). As shown in FIG. 3, input terminals of the ith computation circuit are connected to the ith local memory, and output terminals of the ith computation circuit are connected to, via the high-speed communication interface $H_i$, to the (i+1)th local memory.

The input data and learnable parameters of the ith computation circuit are stored in the ith local memory. If the computational layer $L_i$ is a hidden layer nearest to the input layer (not shown), input data stored in the ith local memory is provided by the input layer. If the computational layer $L_i$ is not a hidden layer nearest to the input layer, input data stored in the ith local memory is provided by the computational layer $L_{(i-1)}$, i.e. computation results generated by the (i−1)th computation circuit. When the neural network 200 is in a training process, learnable parameters stored in the ith local memory may be modified over and over again until the difference between training results and an ideal results is converged to lower than a predetermined threshold. Thereafter, in normal computation processes, learnable parameters stored in the ith local memory are fixed values determined by the training process.

Practically, the computational layers $L_1$ to $L_N$ can be implemented by serially connecting plural identical unit chips. The advantage of utilizing identical unit chips is that the number of layers in the neural network 200 is very flexible. As long as more unit chips are serially connected, the number of layers in the neural network 200 can be raised without limit. It is noted that these unit chips can be configured to be located physically in the same integrated-circuit chip, in different integrated-circuit chips but the same package, or in different packages. In other words, two adjacent computational layers in the neural network 200 can be connected via a high-speed communication interface inside an integrated-circuit chip, crossing two integrated-circuit chips, crossing two packages, or even crossing two circuit boards.

In one embodiment, the computational layers $L_1$ to $L_N$ operate simultaneously based on a pipeline architecture so as to increase the overall throughput of the neural network 200. For example, assuming plural sets of data are sequentially provided to the neural network 200, when the computational layer $L_1$ is performing computations on the nth set of data, the computational layer $L_2$ can perform computations on the (n−1)th set of data, . . . , the computational layer $L_N$ can perform computations on the first set of data.

With the aforementioned pipeline architecture, the computation time needed by each computational layer can be designed as substantially the same. In the following paragraphs, two convolutional layers $L_i$ and $L_{(i+1)}$ are taken as an example. The sampling window size is 2*2 and the sampling stride is 1 in both layers. The input of the layer $L_i$ is a 3*3 data matrix, and the input of the layer $L_{(i+1)}$ is a 2*2 data matrix. To make the computation time needed by layers $L_i$ and $L_{(i+1)}$ substantially the same, five dummy data (e.g. zero) is filled into the input data matrix of the layer $L_{(i+1)}$. In this way, the size of input data matrices for the layers $L_i$ and $L_{(i+1)}$ are both 3*3 now. The input data matrices stored in the ith local memory and the (i+1)th local memory are visualized in FIG. 4(A), wherein real data is represented by solid dots and dummy data is represented by hollow dots with solid outlines.

Figure 4A:
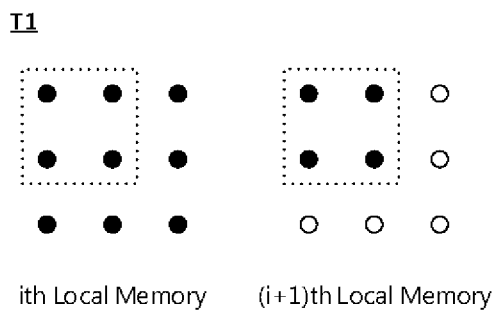
FIG. 4(A) to FIG. 4(E) illustrate the input data matrices stored in two local memories.

First, as shown in FIG. 4(A), in work cycle T1, the sampling windows (represented by squares with dashed outlines) of the layers $L_i$ and $L_{(i+1)}$ respectively cover four locations in the ith local memory and the (i+1)th local memory with coordinates (1, 1), (2, 1), (1, 2), and (2, 2). More specifically, in work cycle T1, the ith computation circuit performs computations on data stored in locations with coordinates (1, 1), (2, 1), (1, 2), and (2, 2) in the ith local memory, and the (i+1)th computation circuit performs computations on data stored in locations with coordinates (1, 1), (2, 1), (1, 2), and (2, 2) in the (i+1)th local memory. Since the data amounts to be processed are the same, the ith computation circuit and the (i+1)th computation circuit would complete their computation almost at the same time. Then, the ith computation circuit stores its computation result $R_{i\_T1}$ into the location with coordinates (1, 1) in the (i+1)th local memory. In other words, the data stored in this location is updated; an updated data is represented by hollow dots with dashed outlines. It is noted that since for a convolutional layer, the data previously stored in the location with coordinates (1, 1) in the (i+1)th local memory is not needed anymore after work cycle T1, replacing this data with the computation result $R_{i\_T1}$ would not induce any problem. Similarly, the (i+1)th computation circuit stores its computation result $R_{(i+1)\_T1}$ into the location with coordinates (1, 1) in the (i+2)th local memory (not shown).

Figure 4B:
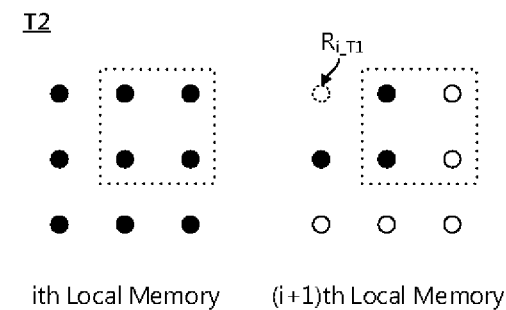

Then, as shown in FIG. 4(B), in work cycle T2, the sampling windows of the layers Li and L(i+1) respectively cover four locations in the ith local memory and the (i+1)th local memory with coordinates (2, 1), (3, 1), (2, 2), and (3, 2). This time, the ith computation circuit stores its computation result Ri_T2 into the location with coordinates (2, 1) in the (i+1)th local memory. Similarly, the (i+1)th computation circuit stores its computation result R(i+1)_T2 into the location with coordinates (2, 1) in the (i+2)th local memory. It is noted that the computation result R(i+1)_T2 is generated partially based on dummy data and accordingly an invalid computation result. How invalid computation results are processed will be introduced later.

Figure 4C:
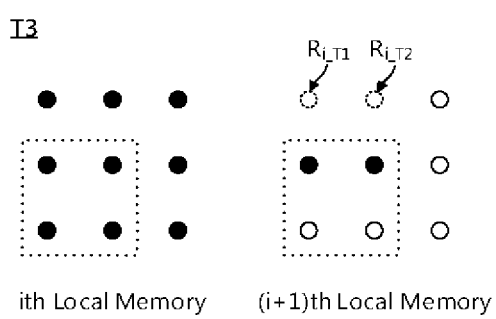

Subsequently, as shown in FIG. 4(C), in work cycle T3, the sampling windows of the layers $L_i$ and $L_{(i+1)}$ respectively cover four locations in the ith local memory and the (i+1)th local memory with coordinates (1, 2), (2, 2), (1, 3), and (2, 3). This time, the ith computation circuit stores its computation result $R_{i\_T3}$ into the location with coordinates (1, 2) in the (i+1)th local memory. The (i+1)th computation circuit stores its computation result $R_{(i+1)\_T3}$ into the location with coordinates (1, 2) in the (i+2)th local memory. Similarly, the computation result $R_{(i+1)\_T3}$ is an invalid computation result.

Figure 4D:
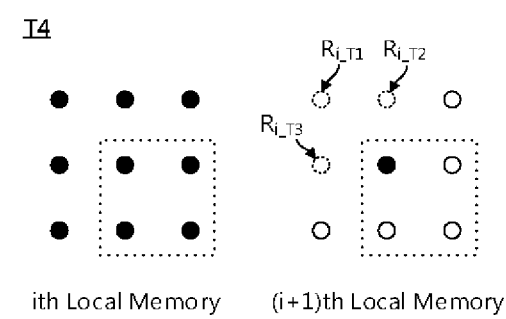
Figure 4E:
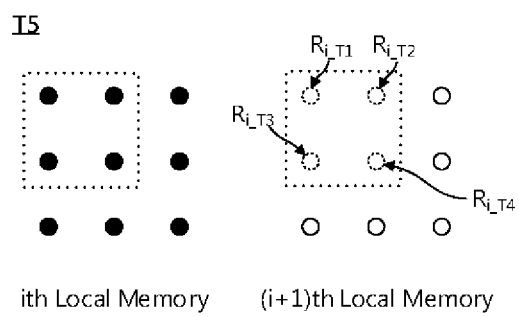

Then, as shown in FIG. 4(D), in work cycle T4, the sampling windows of the layers $L_i$ and $L_{(i+1)}$ respectively cover four locations in the ith local memory and the (i+1)th local memory with coordinates (2, 2), (3, 2), (2, 3), and (3, 3). This time, the ith computation circuit stores its computation result $R_{i\_T4}$ into the location with coordinates (2, 2) in the (i+1)th local memory. The (i+1)th computation circuit stores its computation result $R_{(i+1)\_T4}$ into the location with coordinates (2, 2) in the (i+2)th local memory. Similarly, the computation result $R_{(i+1)\_T4}$ is an invalid computation result.

Figure 5:
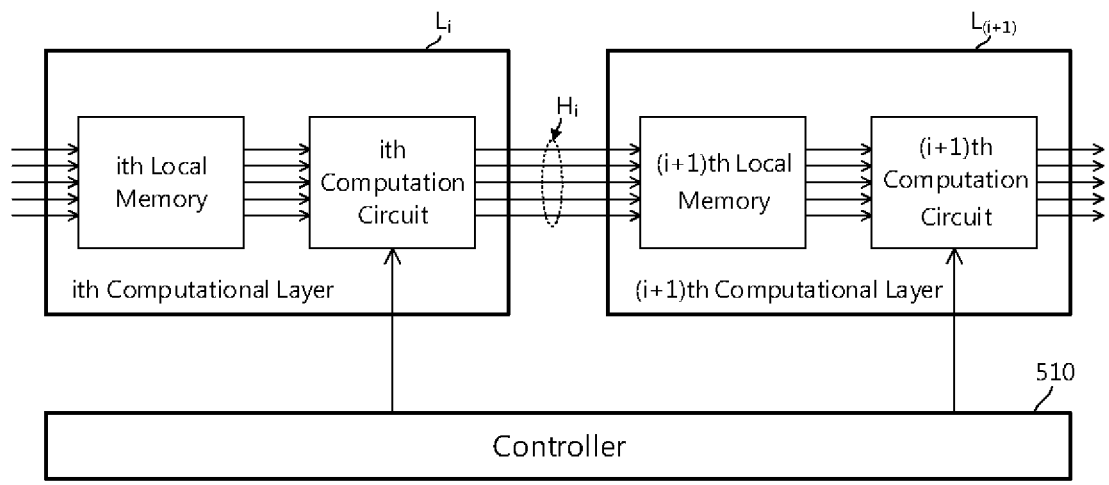
FIG. 5 illustrates the detailed connection between the controller and two adjacent computational layer according to the invention.

As shown in FIG. 5, the neural network 200 can further include a controller 510 coupled to the ith computation circuit and (i+1)th computation circuit. The controller 510 is configured to invalidate computation results generated based on dummy data and validate computation results generated totally based on real data. Taking the conditions shown in FIG. 4 as an example, the controller 510 would request the (i+1)th computation circuit to invalidate the computation results $R_{(i+1)\_T2}/R_{(i+1)\_T3}$, and $R_{(i+1)\_T4}$; only the computation result $R_{(i+1)\_T1}$ is validated and kept. Practically, the controller 510 can request the (i+1)th computation circuit not to actually perform computations for generating the computation results $R_{(i+1)\_T2}$, $R_{(i+1)\_T3}$, and $R_{(i+1)\_T4}$. Alternatively, the controller 510 can request the (i+1)th computation circuit not to pass the computation results $R_{(i+1)\_T2}$, $R_{(i+1)\_T3}$, and $R_{(i+1)\_T4}$ to the (i+2)th local memory. Because the real size of input data matrix for each computational layer is known, the controller 510 can explicitly know which computation results should be invalidated. Practically, the controller 510 can be implemented by a variety of fixed and/or programmable logic, such as field-programmable logic, application-specific integrated circuits, microcontrollers, microprocessors and digital signal processors. The controller 510 may also be designed as executing a process stored in a memory as executable instructions.

In the example shown in FIG. 4(A) to FIG. 4(D), the ith computation circuit sequentially generates computation results $R_{i\_T1}$, $R_{i\_T2}$, $R_{i\_T3}$, and $R_{i\_T4}$. Until the end of work cycle T4, the computations needed to be performed on the input data matrix in the ith local memory shown in FIG. 4(A) are all completed. It can be seen in FIG. 4(E), at the beginning of work cycle T5, the computation results $R_{i\_T1}$, $R_{i\_T2}$, $R_{i\_T3}$, and $R_{i\_T4}$ previously generated by the layer $L_i$, i.e. exactly the new input data matrix for the layer $L_{(i+1)}$, have been stored in the four locations with coordinates (1, 1), (2, 1), (1, 2), and (2, 2) in the (i+1)th local memory. Besides, learnable parameters corresponding to the layer $L_{(i+1)}$ have always been stored in the (i+1)th local memory. Therefore, the (i+1)th computation circuit can rapidly start to perform its following computation work. In other words, the (i+1)th computation circuit almost or completely does not have to spend time waiting for data transfer; its computation resource can be fully utilized.

It is noted that the idea shown above can be easily generalized to convolutional layers with different sizes of input data matrices, sampling windows, and sampling strides. In actual applications, the layers $L_i$ and $L_{(i+1)}$ may respectively include tens of thousands of neurons. A high-speed communication interface such as a high-speed serializer-deserializer can have transmission speed higher than 10 Gbps. Therefore, even the ith and (i+1)th computation circuits respectively generate hundreds or thousands of computation results at the same time, the idea shown in FIG. 4 can still be practical and useful.

It is noted the step of storing the computation result $R_{i\_T1}$ into the (i+1)th local memory can also be executed in work cycle T2. Moreover, transferring the computation result $R_{i\_T1}$ into the (i+1)th local memory can be executed in parallel with generating the computation result $R_{i\_T2}$ in the ith computation circuit. More generally, assuming the ith computation circuit sequentially generates Q computation results (Q being an integer larger than 1), when providing the (q−1)th computation result to the local memory in the (i+1)th computational layer, the ith computation circuit can generate the qth computation result among the Q computation results at the same time (q being an integer index ranging from 2 to Q). Thereby, the overall computation time in the multi-layer neural network can be shortened.

Figure 6:
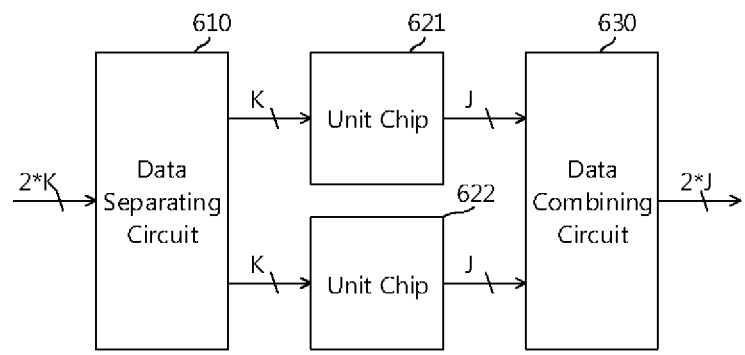
FIG. 6 illustrates the idea of connecting two unit chips in parallel so as to increase data throughput.

As described above, the computational layers $L_1$ to $L_N$ can be implemented by identical unit chips. Besides serial connections, the unit chips can also be connected in parallel. Assume each unit chip can receive at most K input data and can generate at most J computation results. As shown in FIG. 6, a data separating circuit 610 first separates 2*K data into two groups. The unit chips 621 and 622 respectively perform computations on one data group and respectively generate J computation results. Then, the two groups of computation results are combined in the data combining circuit 630. The total number of computation results is accordingly 2*J. Analogically, a computational layer including M unit chips connected in parallel can generate M*J computation results, wherein M is a positive integer.

Figure 7:
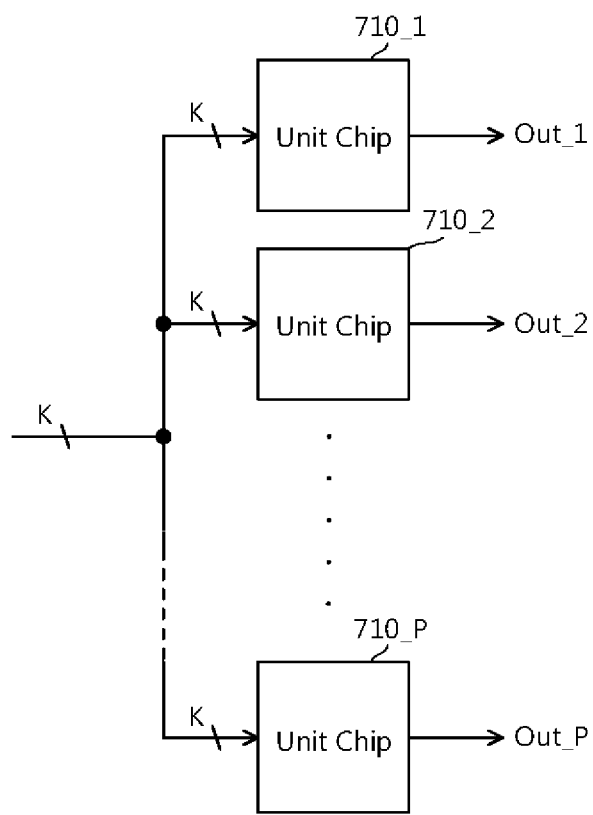
FIG. 7 illustrates the idea of connecting multiple unit chips in parallel to form a fully-connected layer.

The aforementioned concept of connecting unit chips in parallel can be applied to both convolutional and fully-connected layers. FIG. 7 illustrates an example of connecting P unit chips in parallel (P being a positive integer); the P unit chips work as P neurons in a fully-connected layer. The unit chips 710_1 to 710_P respectively receive the same K input data, perform weighted operations on the K input data, sum up the weighted values, and perform an activation computation. Each unit chip generates a computation result; the P unit chips in total generate P computation results (Out_1 to Out_P).

Practically, the computational layers $L_1$ to $L_N$ in the neural network 200 do not have to be implemented totally by unit chips. Taking the AlexNet as an example, the circuit designer can implement the five convolutional layers with unit chips and implement the three fully-connected layer with circuits other than unit chips. It is noted that besides the computational layers $L_1$ to $L_N$ and the controller 510, artificial neural networks according to the invention can include other circuits, such as but not limited to a pooling layer connected subsequent to a convolutional layer and an oscillator for generating clock signals. Those ordinarily skilled in the art can comprehend that the scope of the invention is not limited to a specific network structure. A multi-layer neural network according to the invention can be applied to but not limited to the following network structures: the LeNet proposed by Yann LeCun, the AlexNet proposed by Alex Krizhevsky et al., the ZF Net proposed by Matthew Zeiler et al., the GoogLeNet proposed by Szegedy et al., the VGGNet proposed by Karen Simonyan et al., and the ResNet proposed by Kaiming He et al.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-layer neural network, comprising:
   at least one high-speed communication interface;
   N computational layers serially connected via the at least one high-speed communication interface, N being an integer larger than 1, each of the N computational layers respectively comprising a computation circuit and a local memory, the local memory being configured to store input data and learnable parameters for the computation circuit, the computation circuit in the ith computational layer providing its computation results, via the at least one high-speed communication interface, to the local memory in the (i+1)th computational layer as the input data for the computation circuit in the (i+1)th computational layer, wherein i is an integer index ranging from 1 to (N−1), wherein the computation circuit in a jth computational layer is configured to perform computation based on both real data and dummy data, the dummy data filled into an input matrix of the jth computational layer to expand a size of the input matrix of the jth computational layer to be equal to a size of an input matrix of the (j−1)th computational layer; and
   a controller coupled to the computation circuit and configured to invalidate computation results generated based on the dummy data and validate computation results generated completely based on real data.

2. The multi-layer neural network of claim 1, wherein the N computational layers are implemented by at least N identical unit chips.

3. The multi-layer neural network of claim 2, wherein the N computational layers comprise a convolutional layer, this convolutional layer comprises M identical unit chips connected in parallel, and M is a positive integer larger than 1.

4. The multi-layer neural network of claim 2, wherein the N computational layers comprise a fully-connected layer, this fully-connected layer comprises P identical unit circuits connected in parallel and working as P neurons, and P is a positive integer larger than 1.

5. The multi-layer neural network of claim 1, wherein the computation circuit in the ith computational layer sequentially generates Q computation results, Q is an integer larger than 1; when generating the qth computation result among the Q computation results, the computation circuit provides the (q−1)th computation result to the local memory in the (i+1)th computational layer at the same time, wherein q is an integer index ranging from 2 to Q.

6. The multi-layer neural network of claim 1, wherein the N computational layers operate simultaneously based on a pipeline architecture.

7. The multi-layer neural network of claim 1, wherein the high-speed communication interface comprises a serializer-deserializer (SerDes) or a radio frequency interface (RFI).

8. The multi-layer neural network of claim 1, wherein the ith computational layer and the (i+1)th computational layer are configured to be located in the same integrated-circuit chip, in two different integrated-circuit chips but the same package, or in two different packages.

* * * * *